(12) United States Patent
Loy, Jr.

(10) Patent No.: US 6,575,501 B1
(45) Date of Patent: Jun. 10, 2003

(54) TUBE SEALING BUSHING

(75) Inventor: H. Max Loy, Jr., Houston, TX (US)

(73) Assignee: Valco Instruments Company, Inc.

( * ) Notice: Subject to any disclaimer, the term of this patent is extended or adjusted under 35 U.S.C. 154(b) by 0 days.

(21) Appl. No.: 09/658,913

(22) Filed: Sep. 11, 2000

Related U.S. Application Data

(63) Continuation-in-part of application No. 09/562,000, filed on May 1, 2000, now abandoned, which is a continuation-in-part of application No. 09/368,364, filed on Aug. 4, 1999, now abandoned.
(60) Provisional application No. 60/123,060, filed on Mar. 5, 1999.

(51) Int. Cl.[7] .............................. F16L 17/00; F16L 21/02
(52) U.S. Cl. ...................... 285/342; 285/339; 285/343; 285/353
(58) Field of Search ................................ 285/342, 343, 285/339, 353

(56) References Cited

U.S. PATENT DOCUMENTS

| 1,927,464 | A | * | 9/1933 | McIntosh | 285/4 |
|---|---|---|---|---|---|
| 2,287,889 | A | * | 6/1942 | Krumsiek et al. | 285/342 |
| 2,300,584 | A | * | 11/1942 | Martin | 285/234 |
| 2,381,554 | A | * | 8/1945 | Norgren | 285/343 |
| 2,463,707 | A | * | 3/1949 | Matousek | 285/341 |
| 2,562,294 | A | * | 7/1951 | Cahenzli | 285/148.23 |
| 3,055,684 | A | * | 9/1962 | Currie | 285/342 |
| 3,186,743 | A | * | 6/1965 | Russell | 285/238 |
| 3,498,647 | A | * | 3/1970 | Schroder | 285/343 |
| 4,030,741 | A | * | 6/1977 | Fidrych | 285/161 |
| 4,690,437 | A | * | 9/1987 | Anderson, Jr. | 285/356 |
| 4,776,618 | A | * | 10/1988 | Barree | 285/341 |
| 4,787,656 | A | * | 11/1988 | Ryder | 285/177 |
| 5,288,113 | A | * | 2/1994 | Silvis et al. | 285/342 |
| 5,516,156 | A | * | 5/1996 | Williamson | 285/212 |
| 5,857,719 | A | * | 1/1999 | Hansen | 285/343 |
| 6,007,106 | A | | 12/1999 | Wilkins | 285/110 |
| 6,056,331 | A | * | 5/2000 | Benett et al. | 285/343 |
| 6,095,572 | A | | 8/2000 | Ford et al. | 285/361 |

* cited by examiner

Primary Examiner—James R. Brittain
Assistant Examiner—Carlos Lugo
(74) Attorney, Agent, or Firm—Kenneth A. Keeling; James E. Hudson, III

(57) ABSTRACT

A deformable bushing to seal tubing to a receiving body is provided. The bushing includes a pair of grooves extending around the bushing with an annular ring between the grooves. The grooves are cut to a depth leaving sufficient wall thickness, and have an inscribed angle of about 90 degrees. An alignment flange may be provided at one end of the bushing to align the axis of the tubing with the axis of the through-hole in the receiving body.

2 Claims, 1 Drawing Sheet

TUBE SEALING BUSHING

This application is a continuation-in-part of U.S. patent application Ser. No. 09/562,000, filed May 1, 2000, now abandon which is a continuation-in-part of U.S. patent application Ser. No. 09/368,364, filed Aug. 4, 1999; now abandon which claims priority from Provisional Application No. 60/123,060, filed Mar. 5, 1999.

BACKGROUND OF THE INVENTION

The present invention relates generally to the field of tubing couplings and, more particularly, to a tube sealing bushing which enables an appropriate grip to be taken and held on tubing which is inserted through the bushing to seal the tubing to a body. It is especially effective with small tubing. For instance, it finds usefulness with tubing which measures a nominal 0.0625 inches to 0.125 inches in diameter, for example. This size of tubing finds great application in chemical test laboratories where it is necessary to connect together several pieces of equipment with tubing.

The bushing of the present invention cooperates with a male nut which is threaded behind the bushing to drive a face of the bushing into a flat bottom detail. The term "detail" applies to the mating surface of the body which receives the bushing. Tubing this small is commonly used with chemical test instruments for small fluid samples. Such instruments include a gas chromatograph and the output equipment connected to it. Suitable valves, switches, accumulators, pumps, and other paraphernalia are well known in chemical test laboratories. All these components are connected together with tubing of the size discussed in this disclosure.

All of this tubing and the various connections have to be made in a tight, leak proof manner. Moreover, the tubing in all instances has to be sealed in such a way that flow is not unduly impeded. Over-crimping of the tubing is probably not a difficulty with one inch tubing and other large sizes. It is much more noticeable in small diameter thin wall tubing such as 0.0625"–0.125" diameter tubing. The tubing may be made of soft plastic and the makeup pressure on the tubing may tend to damage the end of the tubing. The difficulty with crimping near the end of the tube is that the tube is so small that is hard to see with the unaided eye whether or not the tube has been damaged. In thick wall tubes, that is not much of a problem. In the small tubes commonplace in a chemical test laboratory, it is a problem in the sense that it restricts flow. For that reason, it is desirable to use the bushing of the present disclosure so that the tubing connection can be made in a less damaging manner.

The present disclosure is directed to a bushing constructed with a pair of annular, v-shaped external grooves. The bushing is preferable made of a plastic material to enable plastic flow of the bushing. This changes the grip held by the bushing on the tubing so that the grip is accomplished at the grooves and also spaced back along the tube at the large diameter of the bushing.

SUMMARY OF THE INVENTION

In a first aspect, the present invention provides a tubing connection with a plastic bushing. The bushing is made of a deformable plastic including an elongate cylindrical body into which a pair of annular, v-shaped grooves are cut or otherwise formed. The grooves clamp the bushing against the tube that is inserted through the bushing, and thereby resist collapsing the internal passage in a way that damages the tubing. It has been determined that the controlled crimp which is provided by this system is a limited crimp, thereby enhancing the leak sealing performance of the bushing. Enhanced performance includes longer life and the ease of repeated use of the end of a tube as would occur in connecting and disconnecting the tube from an instrument.

In this first aspect of the present disclosure, the bushing is constructed with an alignment flange on the end of the bushing that is inserted into the instrument. The alignment flange mates with a complementary through-hole in the instrument body to align the bore of the tubing with a port in the instrument. The alignment flange is preferably, included with the bushing when sealing smaller diameter tubing, such as 0.0625" tubing, to an instrument. For 0.125" tubing, the alignment flange is eliminated, and the maximum outside diameter of the bushing mates with the minor diameter of the detail.

In a further aspect of the invention, a bushing is provided which includes a pair of V-shaped annular grooves separated by a V-shaped land. This bushing or collapsible bushing is particularly suited for $\frac{1}{32}$" to $\frac{1}{4}$" O.D. tubing and for use with fittings or nuts with mating threads. This bushing collapses when compressed by a mating nut. When used on smaller size tubing, a counterbore in the mating nut receives the end of the bushing. For, larger sizes of tubing, such as 0.125" tubing, the counterbore is unnecessary. As the mating nut presses the bushing into the receiving port of the instrument and the bushing collapses, the collapsed area is pressed into the outside of the tubing, effecting a very secure connection.

This coupling structure is preferably made of a material which varies with the tubing on which it is used. Examples include polyetheretherketone (PAEK), Teflon, FEP, and Tetzel. When used with small ID Teflon or FEP tubing, by sealing in a very small area with the structure of this invention, a tendency to reducing tubing I.D. is greatly minimized.

These and other aspects of the present invention will be immediately apparent to those skilled in the art from a review of the following detailed description along with the accompanying drawings.

BRIEF DESCRIPTION OF THE DRAWINGS

So that the manner in which the above recited features, advantages and objects of the present invention are attained can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DETAILED DESCRIPTION OF PREFERRED EMBODIMENTS

Figure 1:
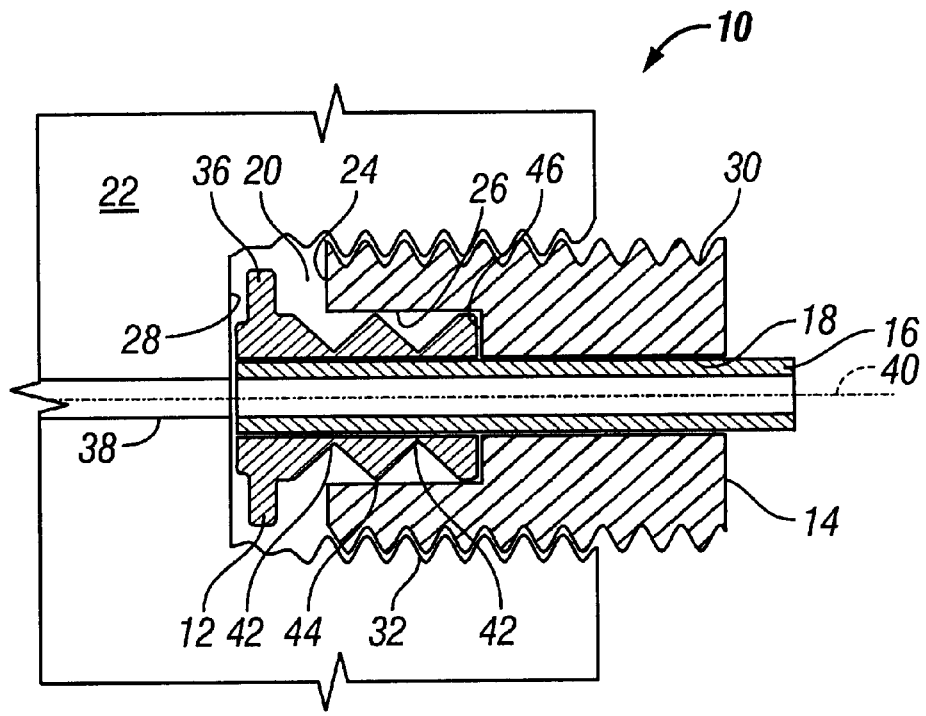
FIG. 1 is a side section view of a fitting system in which a tube is inserted into a body and locked to that body by means of a cooperative male nut and bushing in accordance with the present disclosure.

FIG. 1 shows an assembly 10 which demonstrates the context of a bushing of this invention. The assembly 10 comprises a bushing 12 and a mounting nut 14. A tubing 16 is inserted through an axial bore or passage 18 in the mounting nut 14. The nut 14 is hollow so that the tubing 16 extends beyond the axial bore through the nut. Once the nut is strung onto the tubing, the bushing 12 is then strung onto the tubing, and the assembly is inserted into a receiving bore 20 of an instrument or other body 22 to which the tubing is to be coupled. As shown in FIG. 1, the bushing 12 is preferably flush with the end of the tubing 16.

The male mounting nut has a tip 24, which defines the end of the nut 14. The nut 14 shown in FIG. 1 also includes a counterbore 26, which receives the bushing 12, and the bushing 12 extends beyond the counterbore 26 into the bore 20. The tubing 16 and bushing 12 bottom against a flat surface 28 at the bottom of the bore 20. Bushing counterbore end 46, distal flat surface 28, seats flat against counterbore bottom 29.

The mounting nut 14 is threaded, preferably with mating threads 30, which engage threads 32 of the body 22 to which the tubing is coupled. An alignment flange 36 loosely fits into the minor diameter portion of the bore to align the tubing and bushing with a port 38 in the body 22 so that the tubing, bushing, and port 38 are all aligned along an axis 40.

The bushing 12 further includes a pair of v-shaped grooves 42 and a land 44, which may be machined or otherwise formed in the bushing. When the bushing is compressed between the counterbore 26 in the nut and the surface 28, the grooves 42 provide an annular grip around the tubing to effectively seal the bushing around the tubing without deforming the inside diameter of the tubing.

Figure 2:
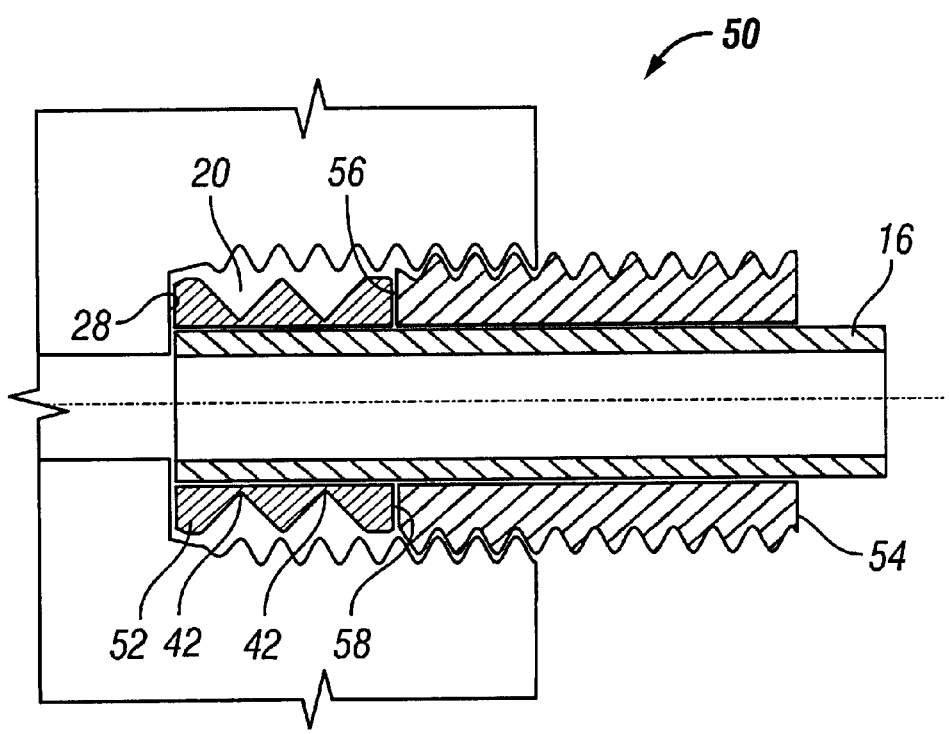
FIG. 2 is a side section view of the bushing of another preferred embodiment of the present invention fitted to a body.

The assembly described above with regard to FIG. 1 is preferred when coupling small size tubing. FIG. 2 illustrates an assembly 50 which is preferred for use with larger tubing 16, for example 0.125" tubing. In this case, the receiving bore 20 and threads 32 of the body to which the tubing is coupled remain the same. The assembly 50 comprises a bushing 52 and amounting nut 54. Note that the alignment flange 36 of the bushing and the counterbore 26 of the mounting nut are eliminated. Rather, the nut 54 includes a flat face 56 for abutting engagement with a flat face 58 on the bushing. The other end of the bushing abuts against the flat face 28 of the bore 20. The bushing includes the V-shaped grooves 42, as with the bushing 12, which function in the same manner as previously described.

While the foregoing is directed to the preferred embodiments, the scope is determined by the claims which follow.

I claim:

1. A tube sealing assembly for coupling tubing to a receiving body, said receiving body having a flat bottom region, the assembly comprising:
   a. a bushing comprising
      i. a cylindrical hollow plastic body defining an axial bore therethrough and an exterior surface;
      ii. V-shaped grooves spaced apart on the exterior surface;
   b. a mounting nut;
   c. a counterbore in said mounting nut to receive said bushing;
      i. said counterbore having a cylindrical interior surface and a bottom surface;
      ii. said counterbore bottom surface perpendicular to said counterbore interior surface; and
   d. said bushing and said mounting nut operable to compress said bushing between said receiving body said flat bottom region and said counterbore bottom surface.

2. A tube sealing assembly for coupling tubing to a receiving body, the assembly comprising:
   a. a bushing comprising
      i. a cylindrical hollow plastic body defining an axial bore therethrough and an exterior surface;
      ii. V-shaped grooves spaced apart on the exterior surface;
   b. a mounting nut;
   c. a counterbore in said mounting nut to receive said bushing;
      i. said counterbore having a cylindrical interior surface and a bottom surface;
      ii said counterbore bottom surface perpendicular to said counterbore interior surface; and
   d. said bushing and said mounting nut operable to compress said bushing between said receiving body and said counterbore bottom surface;
   e. a bore in said receiving body, said bore defining a flat bottom region; and
   f. an alignment flange on said bushing sized to fit within said flat bottom region.

\* \* \* \* \*